(12) United States Patent
Chen et al.

(10) Patent No.: US 8,359,897 B2
(45) Date of Patent: Jan. 29, 2013

(54) METHOD FOR MAKING SHIELDING MEMBER

(75) Inventors: Yun-Lung Chen, Taipei Hsien (TW); Da-Long Sun, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 649 days.

(21) Appl. No.: 12/603,656

(22) Filed: Oct. 22, 2009

(65) Prior Publication Data

US 2010/0326163 A1    Dec. 30, 2010

(30) Foreign Application Priority Data

Jun. 26, 2009    (CN) .......................... 2009 1 0303762

(51) Int. Cl.
*B21D 31/02* (2006.01)
(52) U.S. Cl. ............................... 72/331; 72/334; 29/413
(58) Field of Classification Search ............. 361/679.32, 361/679.4, 752, 800; 72/331, 334–335, 338–339, 72/374, 379.2; 174/355, 369, 382; 29/412–413, 29/415; 439/927, 939; 234/46–47; 83/908
See application file for complete search history.

(56) References Cited

U.S. PATENT DOCUMENTS

| | | | | |
|---|---|---|---|---|
| 199,111 A | * | 1/1878 | Sims | 72/335 |
| 3,339,333 A | * | 9/1967 | Kovalcik | 52/672 |
| 5,650,922 A | * | 7/1997 | Ho | 361/799 |
| 5,679,923 A | * | 10/1997 | Le | 174/372 |
| 6,201,711 B1 | * | 3/2001 | Cherniski et al. | 361/800 |
| 6,403,879 B1 | * | 6/2002 | Clements et al. | 174/358 |
| 6,618,271 B1 | * | 9/2003 | Erickson et al. | 361/818 |

FOREIGN PATENT DOCUMENTS

| | | |
|---|---|---|
| CN | 2560097 Y | 7/2003 |
| CN | 2613802 Y | 4/2004 |
| CN | 2724075 Y | 9/2005 |

OTHER PUBLICATIONS

Amos, S.W.; Amos R.S. (1999). Newnes Dictionary of Electronics. (pp. 114). Elsevier. Online version available at: http://www.knovel.com/web/portal/browse/display?_EXT_KNOVEL_DISPLAY_bookid=1673&VerticalID=0.*

* cited by examiner

*Primary Examiner* — Dana Ross
*Assistant Examiner* — Leonel Vasquez
(74) *Attorney, Agent, or Firm* — Altis Law Group, Inc.

(57) ABSTRACT

A method for making a shielding member includes steps. One step is providing a metal plate. Another step is making the shielding member from the metal plate by stamping. The shielding member includes two shielding plates. Each shielding plate includes a base portion, a first extending portion, a second extending portion and at least one third extending portion. The first extending portion and the second extending portion extend from opposite ends of the base portion. The at least one third extending portion extends from the base portion and positioned between the first extending portion and the second extending portion. The shielding plates connect with each other. The first to third extending portions of one shielding plate are located in alternate positions relative the first to third extending portions of the other shielding plate.

17 Claims, 6 Drawing Sheets

METHOD FOR MAKING SHIELDING MEMBER

BACKGROUND

1. Technical Field

The present disclosure relates to methods, and particularly to a method for making a shielding member capable of shielding electromagnetic waves.

2. Description of Related Art

A computer system usually generates electromagnetic waves, which can pass through a chassis of the computer system if no shielding means is provided. Referring to FIG. 1, a conventional manufactured shielding member 30 is often located on a cage, which can be used to secure Peripheral Component interconnect (PCI) devices thereon. The cage defines a plurality of slots through which connectors of the PCI devices can extend out of the chassis. In order not to block the slots, the conventional manufactured shielding member should define a plurality of openings 35 corresponding to the slots. Conventionally, in conventional manufacturing of the conventional manufactured shielding member, parts of a metal plate are cut away to define the openings and thrown away, which is a waste of material.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
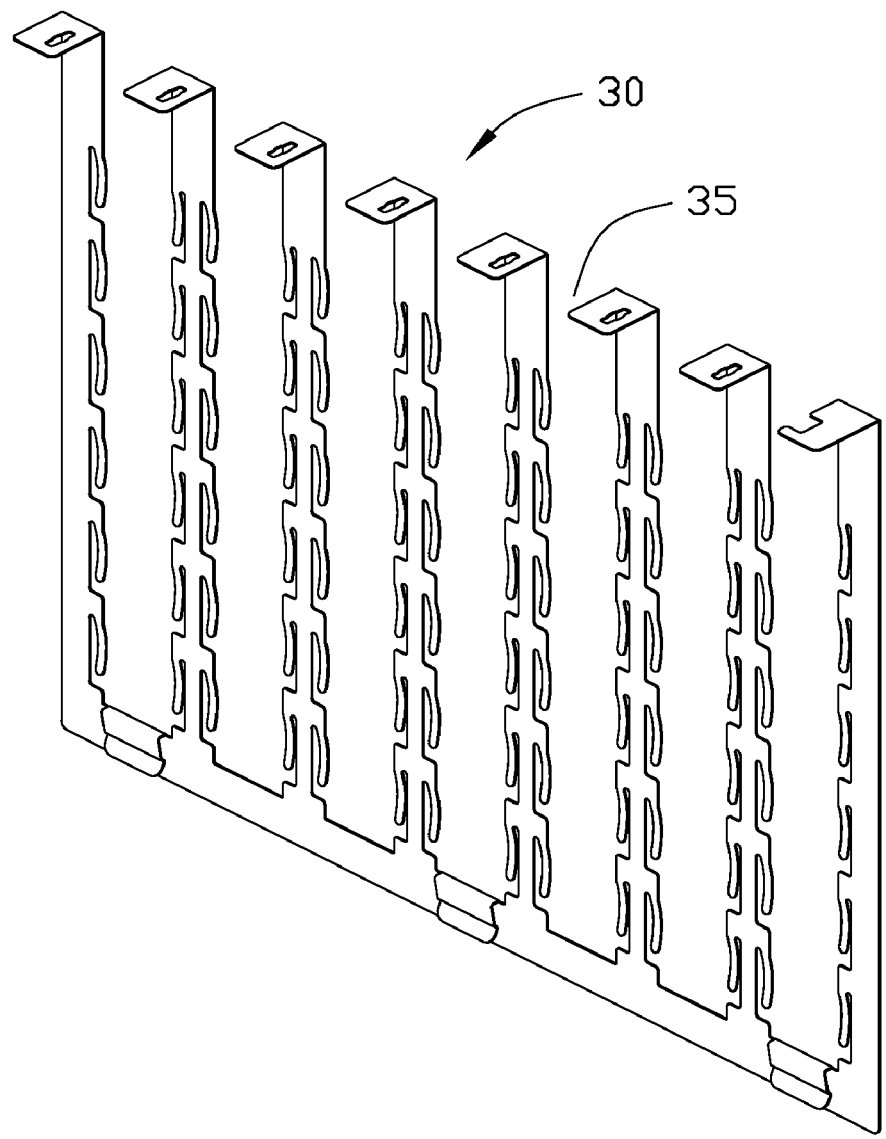
FIG. 1 is an isometric view of a conventional shielding member according to the prior art.
Figure 2:
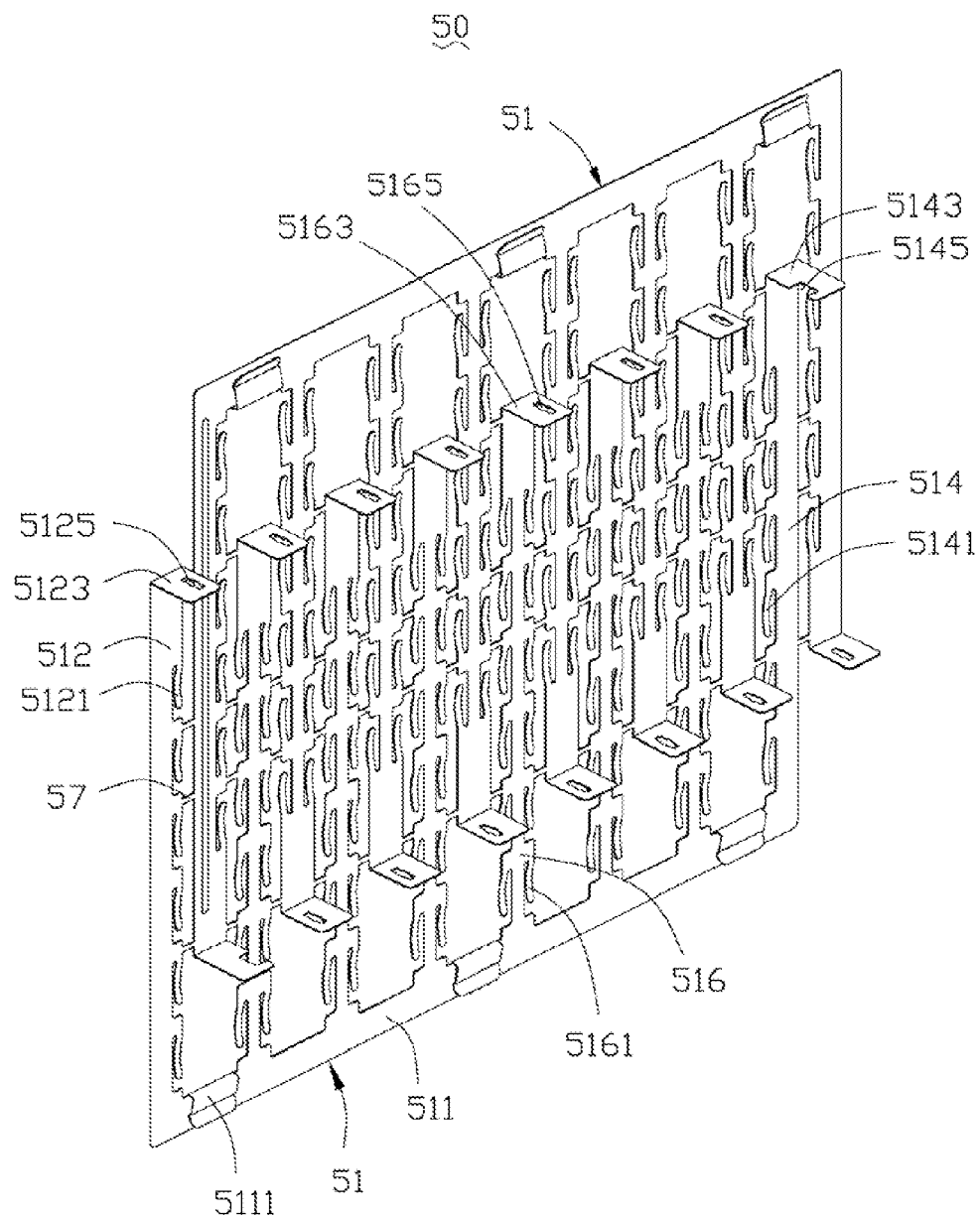
FIG. 2 is an isometric view of a shielding member in accordance with an embodiment.
Figure 3:
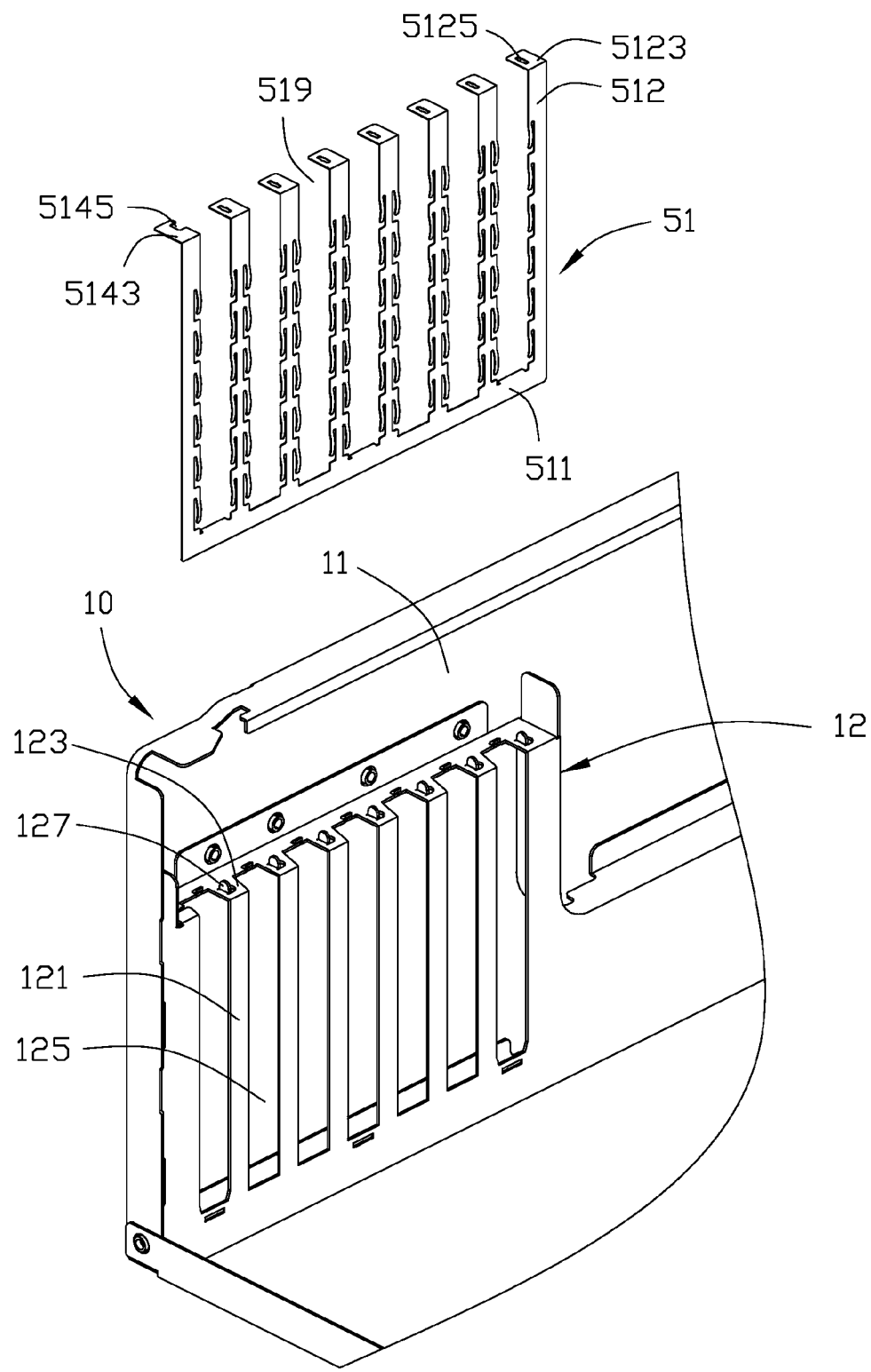
FIG. 3 is an exploded view of first shielding member of FIG. 1 and a chassis.
Figure 4:
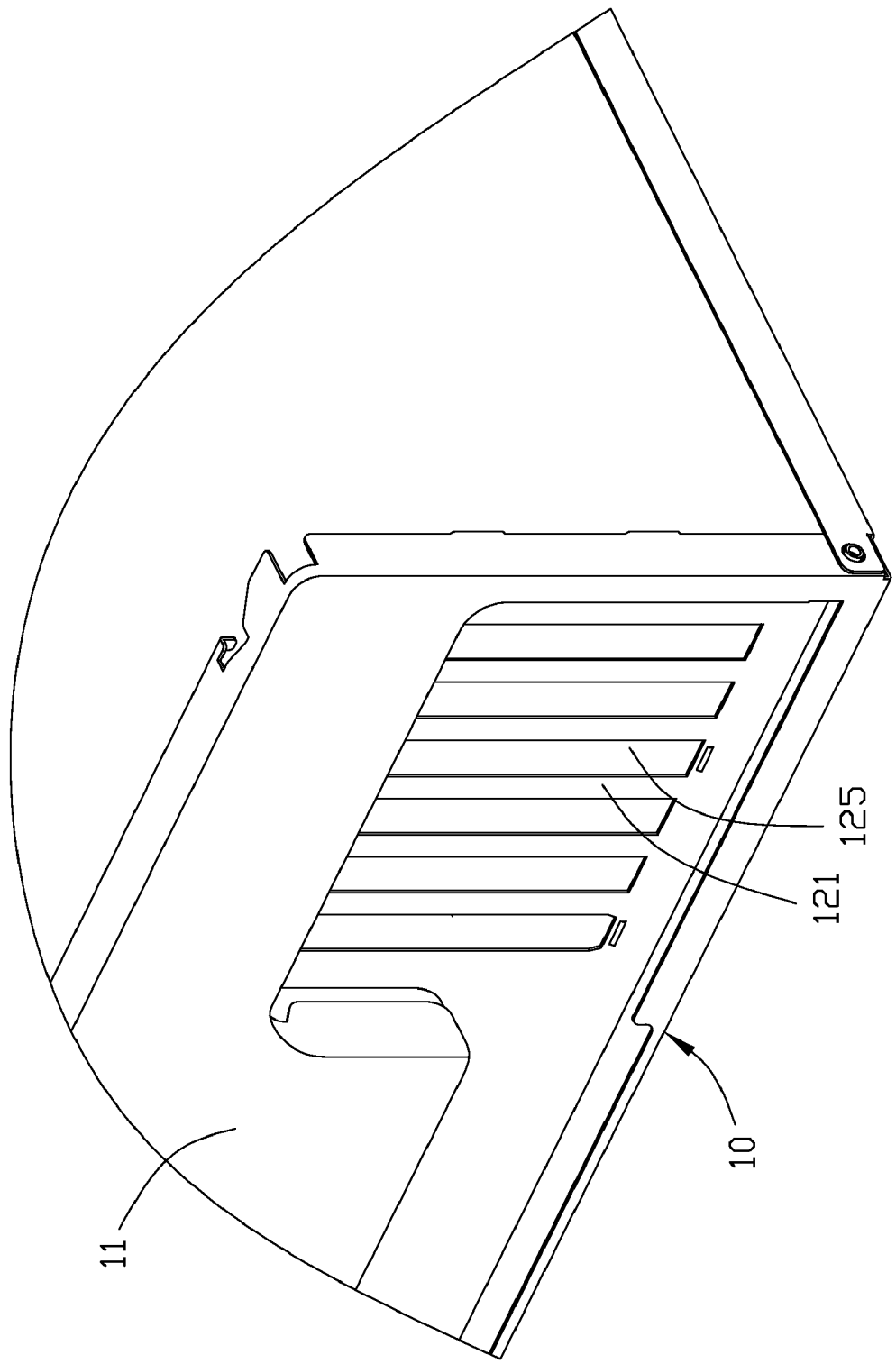
FIG. 4 is a cutaway, isometric view of the chassis of FIG. 3, and showing from another aspect.
Figure 5:
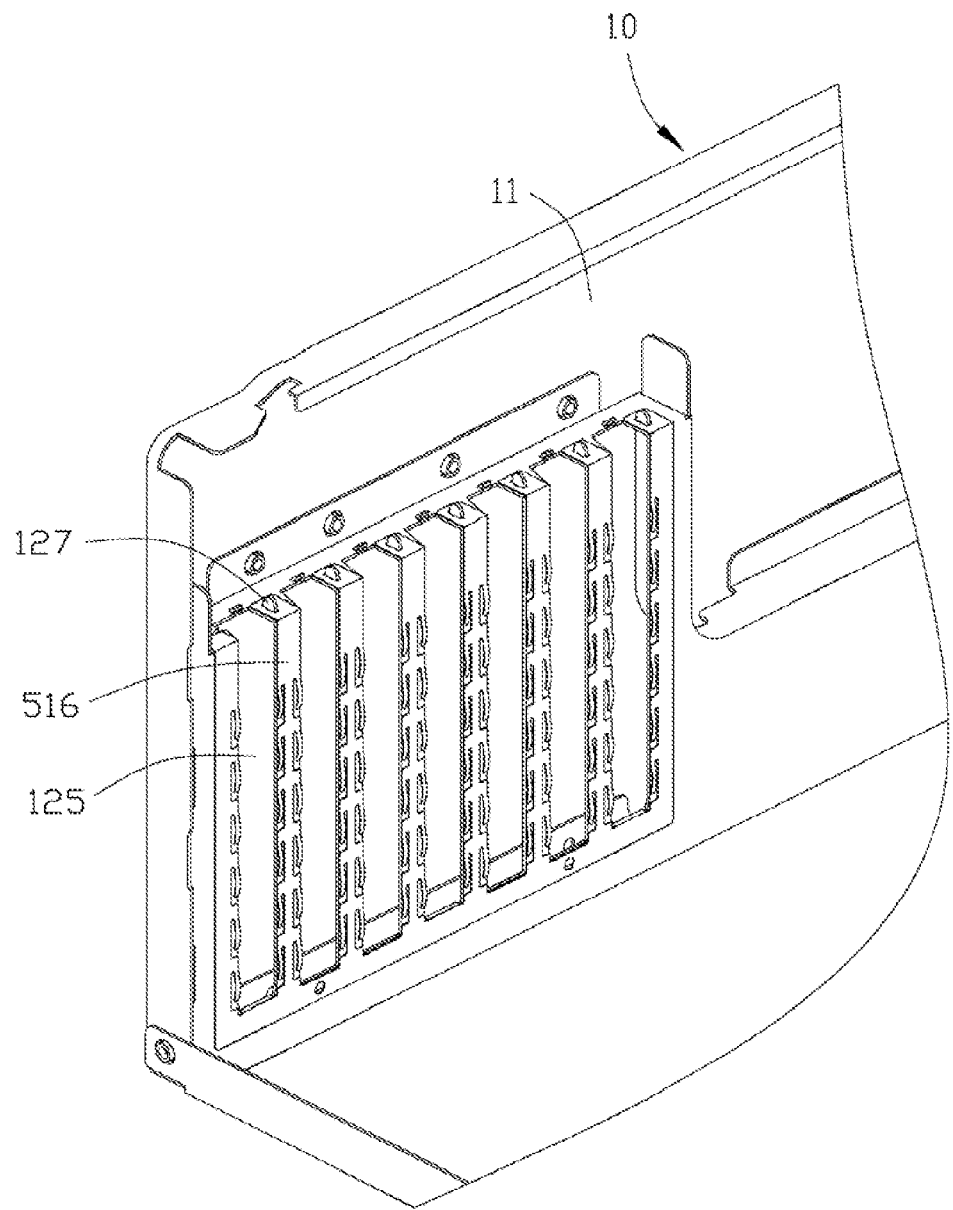
FIG. 5 is an assembled, cutaway view of the chassis of FIG. 3.
Figure 6:
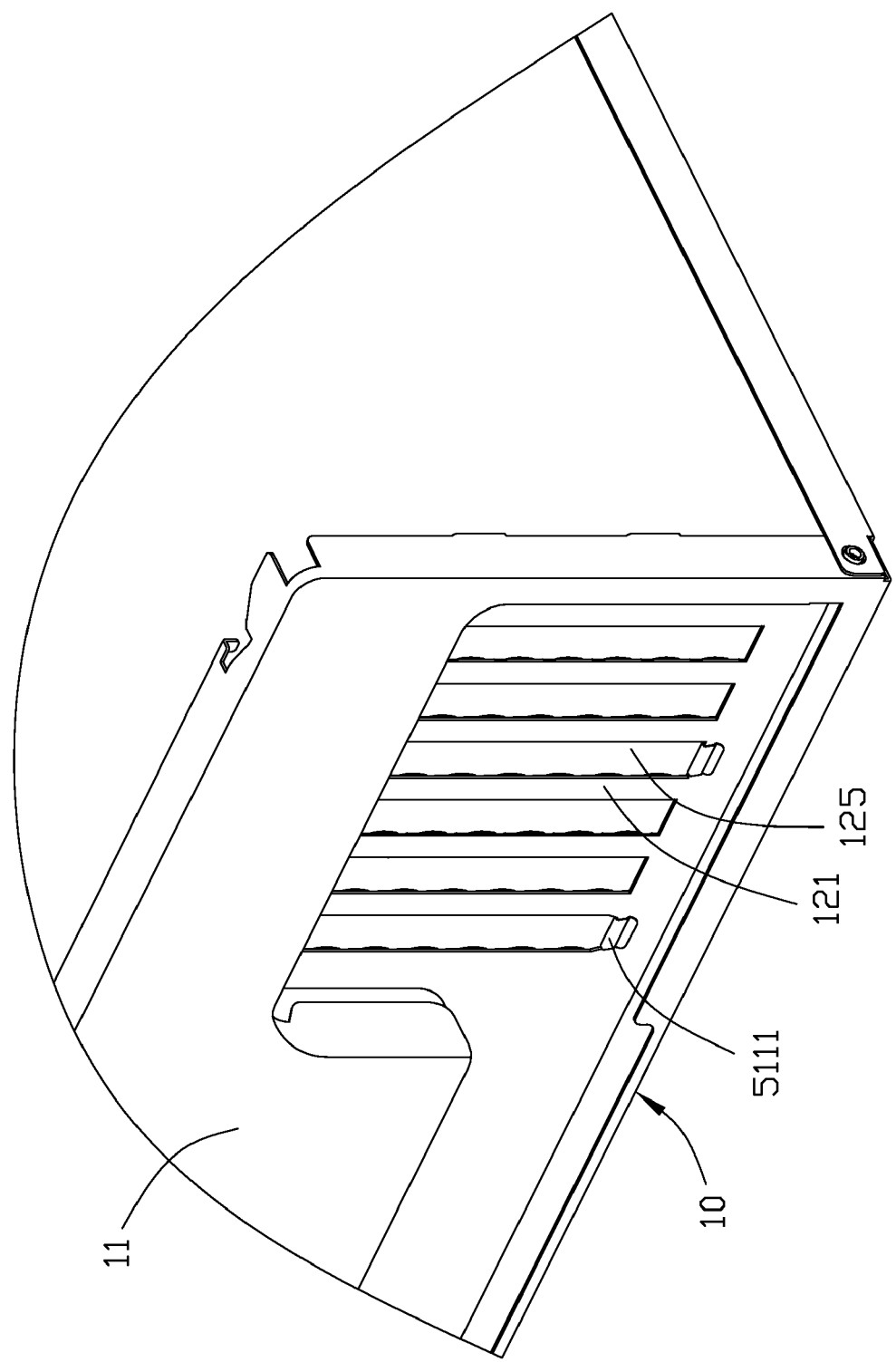
FIG. 6 is similar to FIG. 5, but showing from another aspect.

Referring to FIG. 2, a shielding member 50 in accordance with an embodiment includes two shielding plates 51 integrated with each other. The shielding plates 51 have the same design.

The first shielding plate 51 includes a base portion 511, a first extending portion 512, a second extending portion 514, and a plurality of third extending portions 516. The first extending portion 512 and the second extending portion 514 perpendicularly extend from opposite ends of the base portion 511, respectively. The third extending portions 516 perpendicularly extend from the base portion 511, and are positioned between the first extending portion 512 and the second extending portion 514. The first extending portion 512, the second extending portion 514, and the third extending portions 516 extend in a first direction.

Three clip pieces 5111 are located on the base portion 511. One clip piece 5111 is positioned between the first extending portion 512 and one adjacent third extending portion 516. Another one clip piece 5111 is positioned in a middle position of the base portion 511 between two adjacent third extending portions 516. The other clip piece 5111 is positioned between the second extending portion 514 and one adjacent third extending portion 516. The clip pieces 5111 are bent from the base portion 511 in a second direction reverse to the first direction.

A plurality of first finger pieces 5121 is located on an edge adjacent to one adjacent third extending portion 516. A first bent piece 5123 is perpendicularly bent from a distal end of the first extending portion 512, and a first through hole 5125 is defined in the bent piece 5123.

The second extending portion 514 has a similar structure as the first extending portion 511. A plurality of second finger pieces 5141 is located on an edge, which is adjacent to one adjacent third extending portion 516. A second bent piece 5143 is perpendicularly bent from a distal end of the second extending portion 514. A cutout 5145 is defined in an edge of the second bent piece 5143.

A plurality of third finger pieces 5161 is located at two opposite edges of each third extending portion 516. A third bent piece 5163 is perpendicularly bent from a distal end of each third extending portion 516, and a third through hole 5165 is defined in each of the third bent pieces 5163.

A plurality of connecting pieces 57 is located between the shielding plates 51, so as integrate the shielding plates 51 with each other. Three connecting pieces 57 are used to connect the first extending portion 512 of one shielding plate 51 to the second extending portion 514 of the other shielding plate 51. Another three connecting pieces 57 are used to connect the second extending portion 514 of the one shielding plate 51 to the first extending portion 512 and one adjacent third extending portion 516 of the other shielding plate 51. Another eight connecting pieces 57 are used to connect one third extending portion 516 of the one shielding plate 51 adjacent the first extending portion 512 to the second extending portion 514 and one adjacent third extending portion 516 of the other shielding plate 51. Another eight connecting pieces 57 are used to connect another one third extending portion 516 of the one shielding plate 51 adjacent the second extending portion 514 to the first extending portion 512 and one adjacent third extending portion 516 of the other shielding plate 51. Other connecting pieces 57 are used to connect other third extending portions 516 of the one shielding plate 51 to two adjacent third extending portions 516 of the other shielding plate 51.

In conventional manufacturing of the shielding plates 51, the shielding plates 51 are respectively formed from metal plates, or other Electro-Magnetic-Interference-proof plates, so many scraps are formed and thrown away. Because the first extending portion 512, the second extending portion 514, and the third extending portion 516 of the one shielding plate 51 have alternate positions relative to the first extending portion 512, the second extending portion 514, and the third extending portion 516 of the other shielding plate 51, the shielding plates 51 can be simultaneously formed from one metal plate, for example, by stamping, thereby largely decreasing the amount of scrap produced. Therefore, manufacturing cost can be reduced.

Referring to FIGS. 3-6, a chassis 10 is provided with a rear wall 11. A cage 12 is located on the rear wall 11. The cage 12 includes a vertical portion 121 and a horizontal portion 123 perpendicular to the vertical portion 121. A plurality of slots 125 is defined in the vertical portion 121 and the horizontal portion 123. A plurality of tabs 127 is located on the horizontal portion 123, and between each two tabs 127 a slot 125 is defined.

In use, the connecting pieces 57 can be broke off with a tool or by folding, so that the one shielding plate 51 is disconnected from the other shielding plate 51. Therefore, a plurality of openings 519 (shown in FIG. 3) is defined between the first, second and third extending portions 512, 514, 516 of each shielding plate 51. The openings 519 are correspond to the slots 125 of the chassis 10.

Each of the shielding plates 51 can be secured to the cage 11 of the chassis 10. Securing of one shielding plate 51 to the cage 12 is described as an example. The dip pieces 5111 are inserted in the slots 125, thereby sandwiching the rear wall 11 between the dip pieces 5111 and the base portion 511. The first to third bent pieces 5123, 5143, 5163 are located on the horizontal portion 123. The first through hole 5125, the third through holes 5165, and the cutout 5145 respectively receive the tabs 127. The first to third finger pieces 5121, 5141, 5161 contact with the vertical portion 121. Thus, the shielding plate 51 is secured on the cage 12 of the chassis 10.

The shielding plates 51 are made from a metal plate to prevent electromagnetic waves passing through the cage 11 when PCI devices are secured to the cage 11.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A method for making a shielding member, the method comprising:
   providing a metal plate; and
   making the shielding member from the metal plate by stamping; wherein the shielding member comprises two shielding plates connected with each other, each shielding plate comprises a base portion, a first extending portion, a second extending portion and at least one third extending portion; the first extending portion and the second extending portion extend from opposite ends of the base portion; the at least one third extending portion extends from the base portion and is positioned between the first extending portion and the second extending portion; the first to third extending portions of one shielding plate are located in alternate positions relative the first to third extending portions of the other shielding plate; a plurality of finger pieces are located on the first to third extending portions of each shielding plate.

2. The method of claim 1, wherein extending directions of the first to third extending portions of each shielding plate are the same.

3. The method of claim 2, wherein the extending directions of the first to third extending portions of each shielding plate are perpendicular to the base portion thereof.

4. The method of claim 3, wherein the extending directions of the first to third extending portions of the one shielding plate reverse to the extending directions of the first to third extending portions of the other shielding plate.

5. The method of claim 1, wherein a plurality of connecting pieces are located between the shielding plates so as to connect the shielding plates with each other.

6. The method of claim 5, furthering comprising: separating the shielding plates from each other by breaking of the connecting pieces.

7. The method of claim 1, wherein a first bent piece with a first through hole is bent from the first extending portion of each shielding plate.

8. The method of claim 1, wherein a second bent piece with a cutout is bent from the second extending portion of each shielding plate.

9. The method of claim 1, wherein a third bent piece with a third through hole is bent from the third extending portion of each shielding plate.

10. The method of claim 1, furthering comprising: separating the shielding plates from each other.

11. A method for making a shielding plate, the method comprising:
    providing a plate made of Electro-Magnetic-Interference-proof material;
    forming two shielding plates integrated with each other from the plate; wherein each shielding plate comprises a base portion, a first extending portion, a second extending portion and at least one third extending portion; the first extending portion and the second extending portion extends from opposite ends of the base portion; the at least one third extending portion extends from the base portion and is positioned between the first extending portion and the second extending portion; a plurality of connecting pieces that connect the first to third extending portions of one shielding plate with the third to first extending portions of another shielding plate, and a first bent piece with a first through hole is bent from the first extending portion of each of the shielding plates; and
    separating the two shielding plates from each other by breaking off the connecting pieces.

12. The method of claim 11, wherein extending directions of the first to third extending portions of each of the two shielding plates are same.

13. The method of claim 11, wherein the extending directions of the first to third extending portions are perpendicular to the base portion.

14. The method of claim 11, wherein a plurality of finger pieces are located on the first to third extending portions of each of the two shielding plates.

15. The method of claim 11, wherein a second bent piece with a cutout is bent from the second extending portion of each of the shielding plates.

16. The method of claim 11, wherein a third bent piece with a third through hole is bent from the third extending portion of each of the shielding plates.

17. The method of claim 11, wherein the first to third extending portions of the one shielding plate are located in alternate positions relative the first to third extending portions of the another shielding plate.

* * * * *